March 24, 1970     D. D. STRAIGHT     3,502,109
QUICK RESPONSE PILOT OPERATED VALVE
Filed Dec. 7, 1967     2 Sheets-Sheet 1
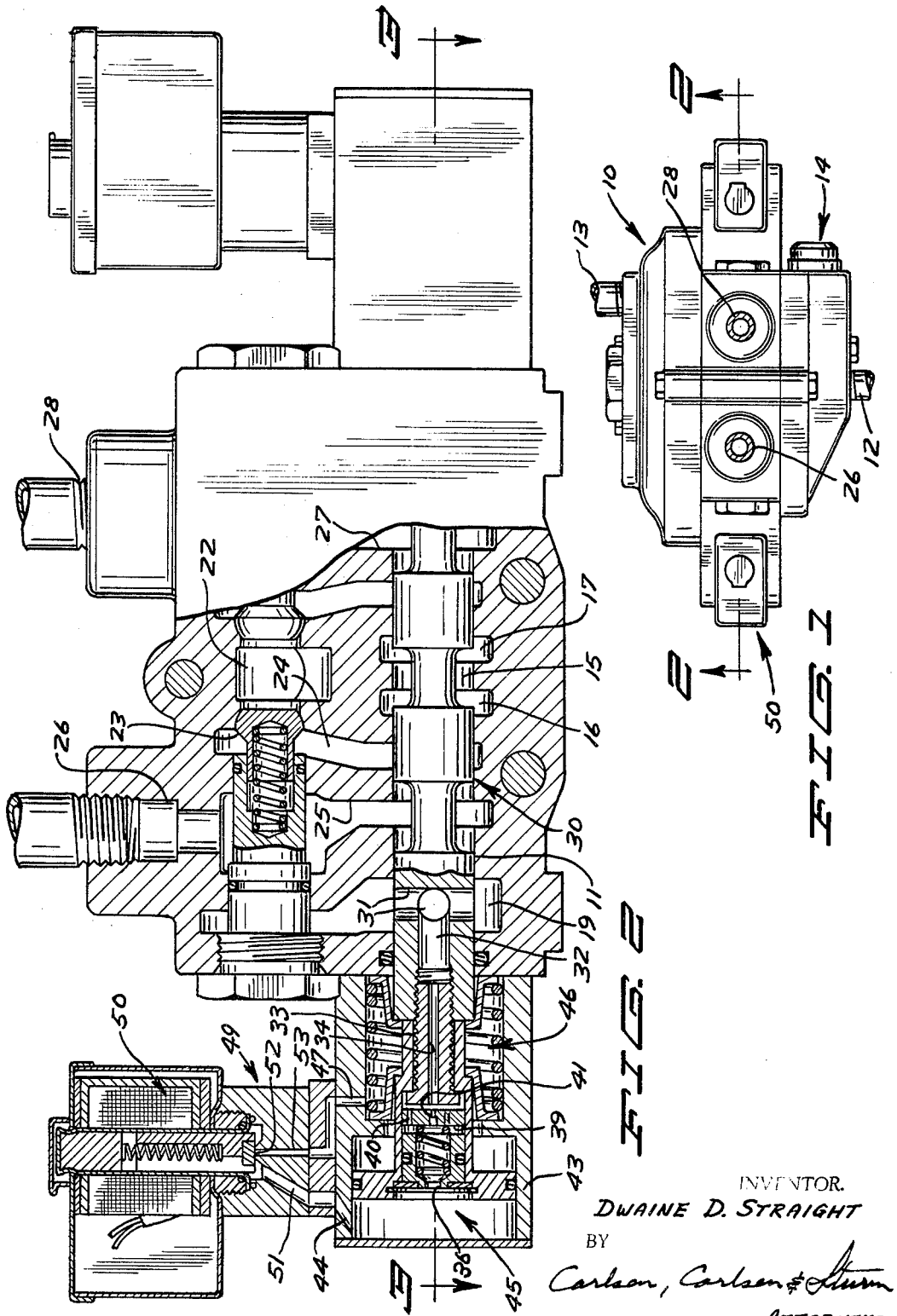
INVENTOR.
DWAINE D. STRAIGHT
BY
Carlsen, Carlsen & Sturm
ATTORNEYS

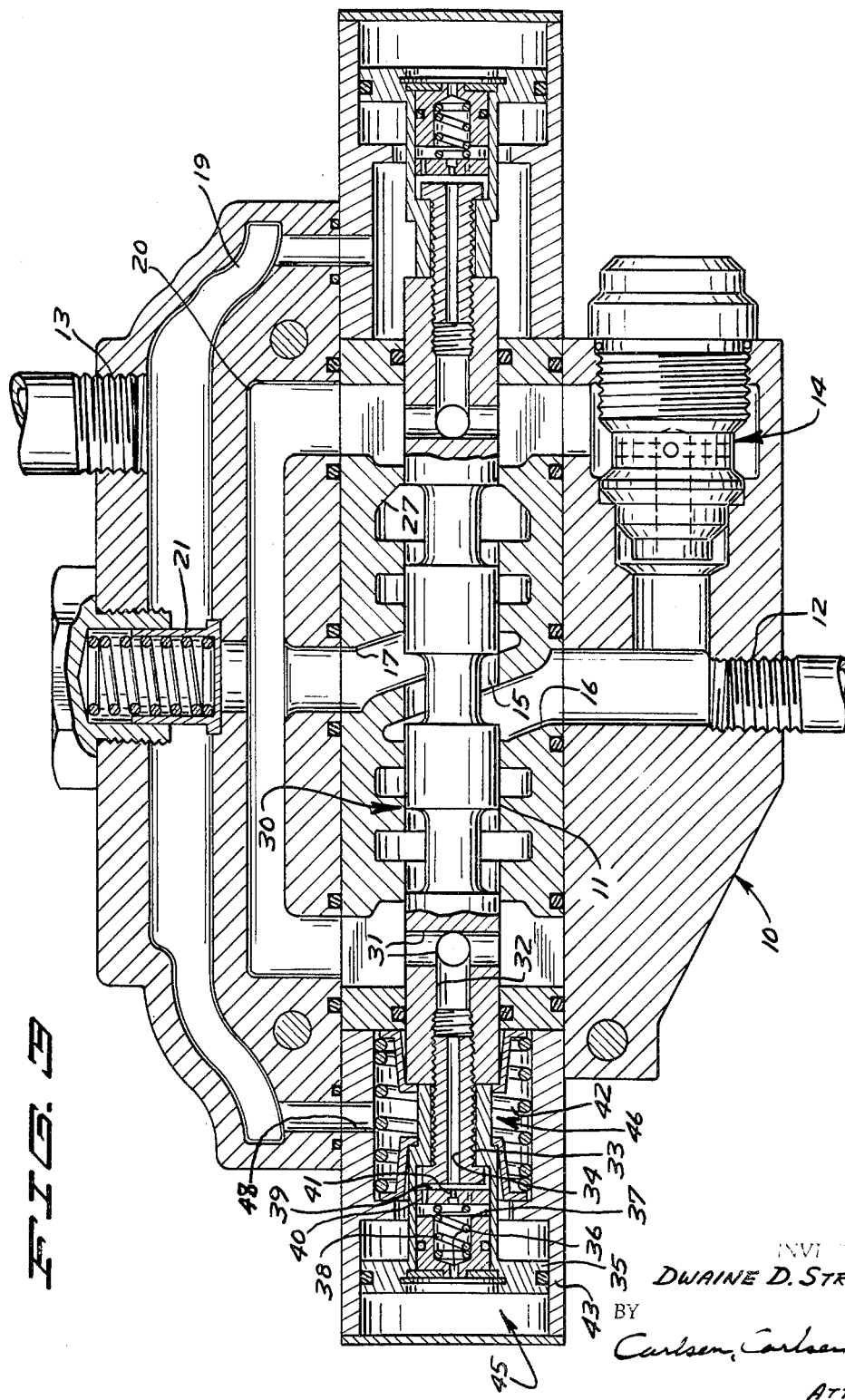

United States Patent Office 3,502,109
Patented Mar. 24, 1970

3,502,109
QUICK RESPONSE PILOT OPERATED VALVE
Dwaine D. Straight, New Brighton, Minn., assignor to Gresen Manufacturing Company, Minneapolis, Minn., a corporation of Minnesota
Filed Dec. 7, 1967, Ser. No. 688,862
Int. Cl. F16k 31/363, 11/07
U.S. Cl. 137—625.64                                11 Claims

ABSTRACT OF THE DISCLOSURE

A pilot operated valve in which fluid under pressure is utilized to position a valve spool in accordance with the operation of a pilot valve. A pressure responsive flow restricting shuttle valve is positioned intermediate the source of fluid under pressure and the valve spool operating apparatus. A normally closed pilot valve is utilized to vent the spool operating apparatus to an exhaust, or tank, duct. The pressure drop across the shuttle valve causes it to move to a flow restricting position to allow a small volume of fluid to flow, and to maintain a low pressure in the valve operating apparatus. Subsequent closing of the pilot valve allows pressure to build up in the valve operating apparatus to which it is connected, to release the shuttle valve and cause a rapid return of the valve spool to a neutral position.

---

This invention relates generally to fluid operated valves and is more particularly directed to fluid operated valves of the class wherein a valve spool is to be disposed in two or more positions through the use of pilot operated spool positioning means which provides a rapid response in operation.

As will become apparent from a consideration of the description of the illustrative embodiment of my invention that follows, I have provided an improved pilot operated valve that is operable under low fluid pressures to provide an efficient and rapid positioning of a primary control spool in response to the operation of uncomplicated and inexpensive pilot control valves of various types that are readily available as may be required by the necessary and available sources of power for operating the pilot valves and causing actuation of a primary valve spool to control the flow of fluid in accordance with the directions of an operator.

The advantages of my invention may be realized in a system in which spool operating means or apparatus is continually energized to maintain or allow a spool to be disposed in, for example, a neutral position or, perhaps, in one of several positions. A normally closed pilot valve assembly may be connected to each of the valve spool operating means for releasing the fluid under pressure therein to, for example, an exhaust duct. A further pressure responsive shuttle valve means is disposed intermediate a source of fluid under pressure and the valve spool operating means is normally biased to a position, in the absence of a predetermined pressure drop thereacross, to allow the flow of a substantial amount of fluid therethrough into the valve spool operating means. When the valve spool operating means is vented through the opening of a pilot valve connected thereto, the shuttle valve is operative to assume a position of restricting the flow of fluid therethrough to a very low volume and the pressure in the other of the valve spool operating means serves to exert a force to move the valve spool to the desired position.

Further, as may be noted from the illustrative embodiment, the shuttle valve may be disposed in the valve spool operating means in such a manner as to assist in the positioning of the primary valve spool during the time that the shuttle valve is operative to restrict the flow of fluid to the valve spool operating means that has been vented to an exhaust duct.

It is therefore an object of my invention to provide an improved pilot operated fluid valve.

It is another object of my invention to provide an improved pilot operated fluid valve that may be operable from a relatively low pressure source of fluid.

Another object of my invention is to provide an improved pilot operated fluid valve having an increased speed of response to signals applied to the pilot controlled actuating means.

These and other objects of my invention will become apparent from a consideration of the appended specification, claims and drawings, in which—

FIG. 1 is a top plan view of a fluid valve incorporating the principles of my invention;

FIG. 2 is an enlarged side elevational view, partly in section, taken along section lines 2—2 on FIG. 1; and FIG. 3 is a full sectional view of the valve shown in FIGS. 1 and 2 taken along section lines 3—3 on FIG. 2.

In the several views of the drawings, certain elements have been omitted or left unidentified for the sake of clarity and in view of the symmetry of the valve and the pilot controlled operating mechanisms.

Referring now to the drawings, my invention is shown disposed in cooperative relationship with a general form of open-center valve of the type shown in United States Letters Patent No. 3,174,510, issued Mar. 23, 1965 in the name of W. R. Nelson and assigned to the assignee of the present invention. It may be apparent that certain modifications have been effected but that the basic operation of the primary valve remains the same as shown and described in the above-noted patent.

A valve body 10 is shown including suitable inlet and outlet manifold portions. It also includes pilot operating mechanisms which will be described in detail below.

Valve body 10 includes a bore 11, an inlet port 12, an outlet tank port 13, a relief valve 14. An open-center port 15 is connected to inlet and outlet ducts 16 and 17 respectively. A tank duct 19 is shown disposed in fluid communication with outlet tank port 13 and an exhaust duct 20, through relief valve apparatus 21 to provide a suitable back pressure in duct 20. A pressure passage 22 is connected to duct 16 through a suitable passage (not shown) and to a further pressure passage 24 through a pressure responsive valve 23. Pressure passage 24 may be placed in fluid communication with control port 26 through suitable positioning of primary control valve spool 30, through control passage 25, as shown on the left-hand portion of FIG. 2. Valve 10 is provided with like, corresponding apparatus on its right-hand end and includes a control passage 27 connected to a control port 28. Control ports 26 and 28 are adapted to be connected to a suitable reversible fluid utilization device, for example, a double acting hydraulic cylinder.

A primary control spool 30 is shown axially, slidably disposed in axial bore 11 in valve body 10 and is of conventional construction except as described below in conjunction with the elements disposed at the outer extremities thereof.

Referring now to FIGS. 2 and 3 of the drawings, the left-hand end of valve spool 30 is shown having a plurality of annular passages 31 that are in fluid communication with an axially outwardly extending passage 32. A suitable plug 33 having an axial passage 34 is shown threadably connected to the outer extremity of axial passage 32 in spool 30. A hollow piston member 35 is shown rigidly connected to the end of spool 30 and is held thereonto by a shoulder provided on plug member 33. Piston 35 is provided with a center aperture 36 that is in fluid communication with a recess 37 provided therein. Recess 37 includes a spring member 38 that is utilized to bias a check shuttle valve member 39 inwardly toward the outer end of spool 30.

Check shuttle valve member 39 has a plurality of radially outwardly disposed apertures 40 and a centrally disposed orifice 41. Piston member 35 is reciprocably disposed in a suitable cylinder 43 that is rigidly attached over the end of bore 11 in body 10. Cylinder 43 includes a fluid passage 44 disposed adjacent outer end chamber 45 and a further inner chamber 46 that is in fluid communication with tank duct 19 in valve body 10 through duct 47. A suitable centering apparatus to tend to maintain piston 35 and valve spool 30 in a center neutral position is disposed in chamber 46 and includes centering spring 42 used in combination with suitable elements well known to those skilled in the art to which my invention pertains.

A solenoid operated pilot valve assembly 49 is shown including a solenoid valve operator 50, an inlet passage 51 connected to passage 44 in cylinder 43, a normally closed valve 52 and an outlet passage 53 connected to chamber 46 through passage 47.

While the detailed description has been applied only to the left end of the valve assembly, the elements on the right-hand end may be seen to be exactly the same as those set forth above.

It may be noted, at this point, that shuttle check valve member 39 is preferably constructed so that the total of the area of apertures 40 and orifice 41 is equal to or greater than the area of axially extending duct 34 in plug member 33 and aperture 36 and that upon movement of shuttle check valve 39 outwardly of valve body 10, apertures 40 engage the inner portion of piston member 35 adjacent recess 37 whereby fluid may flow through recess 37 and aperture 36 only through centrally disposed orifice 41 in shuttle check valve member 39 and that this action occurs whenever the pressure differential exerted outwardly across shuttle check valve member 39 exceed the force supplied by spring member 38.

OPERATION

Referring to FIGS. 2 and 3 of the drawings and assuming that the apparatus is in the de-energized or neutral state in the position shown in the drawings, and further that inlet port 12 is connected to a source of fluid under pressure, outlet port 13 is connected to a tank for receiving fluid and control ports 26 and 28 are connected to, for example, a reversible hydraulic fluid utilization device such as a double acting hydraulic cylinder, fluid will flow into inlet port 12, through open center port 15, into exhaust duct 20, through back pressure relief valve 21, into tank duct 19 and to the tank for hydraulic fluid through tank port 13. At this time, the action of back pressure relief valve 21 serves to create and maintain a low back pressure of suitable predetermined value in exhaust duct 20 from which fluid under pressure may flow into the outer chamber 45 within cylinder 43 through radial passages 31 at each end of primary spool 30, axial passage 32, axial passage 34 in plug 33, apertures 40 and orifice 41 in shuttle check valve 39, recess 37 and axial passage 36 in piston 35 to outer chamber 45 in cylinder 43 and thence through passage 44 in cylinder 43 and inlet passage 51 in solenoid controller 49 to solenoid operated normally closed valve 52. Since this action occurs at each end of primary spool 30, the centering springs 42 are operative to maintain primary valve spool 30 in the position shown in the drawing and the shuttle check valve members 39 remain in the positions shown because of the low pressure differential existing thereacross due to the absence of or an extremely low rate of flow of fluid therethrough.

Assuming that it is desired to move primary spool 30 to the left to connect control port 26 to exhaust and to supply fluid under pressure to control port 28, solenoid valve operator 50 on the left-hand end of FIGS. 2 and 3 is energized to open normally closed valve 52. The fluid in outer chamber 45 on the left end of the valve assembly may then flow through passage 44, inlet passage 51, valve 52, outlet passage 53 and duct 47 into inner chamber 46, and to tank duct 19 through duct 48. At this time, the pressure differential existing across shuttle check valve 39 is sufficient to overcome the force of spring 38 and shuttle check valve 39 will move toward the left to seat against the left-hand portion of piston 35 to effectively close radially spaced apertures 40 and fluid flow is restricted to that which will flow through centrally disposed orifice 41 in a controlled manner. At the same time, fluid under pressure is applied to the right end of the valve assembly through similarly configured passages and ducts from the fluid under back pressure provided in exhaust duct 20, through radial ducts 31 in the right end of primary spool member 30 and thence through apertures 40 and orifice 41 in the right-hand check shuttle valve member 39 and into right-hand chamber 45 in cylinder 43 to exert a high pressure on the outer end of right-hand piston 35 to cause primary valve spool 30 to move to the left extreme position.

When it is desired to return primary valve spool to the center, de-energized position, the solenoid valve operator 50 on the left-hand of the valve assembly is de-energized to close valve 52. The continued flow of fluid through aperture 41 in left-hand check shuttle valve member 39 results in a rapid pressure equalization across shuttle check valve member 39 whereat spring 38 is operative to move shuttle check valve member 39 to the right to allow a greater flow of fluid through radially disposed apertures 40 to result in a pressure equalization that will allow rapid recentering of primary valve spool 30.

Having now therefore fully illustrated and described my invention, what I claim to be new and desire to protect by Letters Patent is:

1. In combination with a valve of the class having a movable valving member for selectively interconnecting fluid ports, the combination comprising; fluid operated valve actuating means connected to a valving member; a source of fluid under pressure; duct means including variable orifice fluid flow restricting means responsive to the flow of fluid in said duct, connecting a source of fluid under pressure to said valve actuating means; and normally closed valve means connecting said valve actuating means to an exhaust duct.

2. The apparatus of claim 1 in which the movable valving member is a valve spool reciprocably disposed in a valve body.

3. The apparatus of claim 2 in which a piston member is disposed on at least one end of the valve spool for reciprocal motion in a cylinder disposed on the end of the valve body.

4. The apparatus of claim 3 in which biasing means are operatively connected to the valve spool to tend to maintain the valve spool in a predetermined position with respect to the valve body.

5. The apparatus of claim 3 in which inner and outer chambers are defined in the cylinder by the piston member and the duct means are connected to one of the chambers and the normally closed valve means are connected to the other of said chambers.

6. The apparatus of claim 3 in which the variable orifice fluid flow restricting means is disposed in the piston member.

7. The apparatus of claim 5 in which the variable orifice fluid flow restricting means is disposed in the piston member.

8. The apparatus of claim 1 in which the variable orifice fluid flow restricting means is comprised of a shuttle valve.

9. The apparatus of claim 5 in which the variable orifice fluid flow restricting means is comprised of a shuttle valve.

10. The apparatus of claim 9 in which the duct means including the variable orifice fluid flow restricting means are disposed intermediate a source of fluid under pressure and the outer chamber in the cylinder and the normally closed valve means is connected to said outer chamber.

11. In a pilot operated valve, the combination comprising; a first port adapted to be connected to a source of pilot operating fluid; an exhaust port; a cylinder chamber; piston means slidably disposed in the chamber; a duct including valve means connecting one end of the chamber to said exhaust port; means connecting the other end of the chamber to said exhaust port; and duct means including pressure responsive flow controlling means including a variable restrictor connecting said first port to said one end of the chamber.

References Cited

UNITED STATES PATENTS

| | | | |
|---|---|---|---|
| 2,916,051 | 12/1959 | Taylor | 137—625.64 |
| 3,209,782 | 10/1965 | Wolpin et al. | 137—625.63 XR |
| 3,304,953 | 2/1967 | Wickline et al. | 137—625.6 XR |
| 3,315,702 | 4/1967 | Passaggio | 137—625.64 |
| 3,340,897 | 9/1967 | Nevulis | 137—625.6 |
| 3,386,457 | 6/1968 | Adams | 137—625.63 XR |

HENRY T. KLINKSIEK, Primary Examiner